United States Patent
Morini et al.

(10) Patent No.: US 8,693,811 B2
(45) Date of Patent: Apr. 8, 2014

(54) HIGH DATA-RATE SOI OPTICAL MODULATOR INCLUDING A MODIFIED STRUCTURE FOR REDUCING THE CAPACITIVE EFFECT BETWEEN DOPED AREAS AND A SUBSTRATE

(75) Inventors: Delphine Morini, Montrouge (FR);
Gilles Rasigade, Paris (FR); Laurent Vivien, Vauhallan (FR)

(73) Assignee: Centre National de la Recherche Scientifique, Paris (FR)

( * ) Notice: Subject to any disclaimer, the term of this patent is extended or adjusted under 35 U.S.C. 154(b) by 14 days.

(21) Appl. No.: 13/258,304

(22) PCT Filed: Mar. 24, 2010

(86) PCT No.: PCT/FR2010/050531
§ 371 (c)(1),
(2), (4) Date: Oct. 26, 2011

(87) PCT Pub. No.: WO2010/109134
PCT Pub. Date: Sep. 30, 2010

(65) Prior Publication Data
US 2012/0033910 A1 Feb. 9, 2012

(30) Foreign Application Priority Data

Mar. 24, 2009 (FR) ................................ 09 51865

(51) Int. Cl.
G02F 1/035 (2006.01)
G02B 6/12 (2006.01)
H01L 21/50 (2006.01)
H01L 21/00 (2006.01)

(52) U.S. Cl.
USPC .......... 385/3; 385/14; 257/E21.499; 438/106

(58) Field of Classification Search
USPC .............. 385/3, 4, 11, 14–16, 1, 2, 129–131;
372/43.01, 45.01, 46.01, 92, 108;
359/245, 247, 248, 276; 438/106;
257/E21.499
See application file for complete search history.

(56) References Cited

U.S. PATENT DOCUMENTS 4,892,835 A 1/1990 Rabinzohn et al.
6,720,623 B2 * 4/2004 Chen ............................. 257/355
(Continued)

FOREIGN PATENT DOCUMENTS

EP 0 285 206 10/1988

OTHER PUBLICATIONS

International Search Report in priority International Application PCT/FR2010/050531.

(Continued)

*Primary Examiner* — Akm Enayet Ullah
(74) *Attorney, Agent, or Firm* — Greer, Burns & Crain, Ltd.

(57) ABSTRACT

An electro-optic modulation component is provided, in particular on an SOI (semiconductor-on-insulator) substrate, improved for better performance at data rates above 10 Gb/s. This improvement is obtained by reducing the influence of the capacitive effects of the structure and of its environment, and more particularly in which the influence of the capacitance of the structure itself is limited by reducing the access resistance in the doped regions or the influence of the capacitive effect of the environment is reduced by modifying the structure of the substrate vertically beneath the active region, for example by thinning the silicon substrate or the insulator, or a combination of these features. The invention furthermore relates to a process for fabricating such a component and to a device or system that includes such a component. These improvements are applicable in 3D integration assembly processes and to electronic and optical hybrid circuits.

24 Claims, 9 Drawing Sheets

(56) References Cited

U.S. PATENT DOCUMENTS

| | | |
|---|---|---|
| 7,251,408 B1 | 7/2007 | Gunn, III et al. |
| 7,391,801 B1 * | 6/2008 | Soref et al. ............... 372/92 |
| 7,555,173 B2 * | 6/2009 | Barrios et al. .............. 385/2 |
| 7,674,642 B2 * | 3/2010 | Shi et al. ................... 438/34 |
| 7,675,106 B2 * | 3/2010 | Bouchakour et al. ...... 257/315 |
| 2002/0071621 A1 | 6/2002 | Yamada |
| 2008/0260320 A1 * | 10/2008 | Laval et al. ................ 385/2 |

OTHER PUBLICATIONS

Search Report from the French Patent Office in the corresponding priority application FR 0951865.

Bahram Jalali et al., "3-D Integration of sub-surface photonics with CMOS, *Proc. of SPIE*", vol. 6124, 2006., pp. 6124OU-1-6124OU-6.

D. Marris-Morini et al., "Low loss and high speed silicon optical modulator based on a lateral carrier depletion structure", *Optics Express*, vol. 16, No. 1, Jan. 7, 2008, pp. 334-339.

L. Liao et al., "40 Gbit/s silicon optical modulator for highspeed applications", *Electronics Letters*, vol. 43, No. 22, Oct. 25, 2007.

Sylvain Maine et al, "Design optimization of a SiGe/Si quantum-well optical modulator", *Journal of Lightwave Technology*, vol. 26, No. 6, Mar. 15, 2008, pp. 678-684.

Sasikanth Manipatruni et al., "High speed carrier injection 18 Gb/s silicon micro-ring electro-optic modulator" *LEOS*, Oct. 21-25, 2007, p. 537.

* cited by examiner

A-A

HIGH DATA-RATE SOI OPTICAL MODULATOR INCLUDING A MODIFIED STRUCTURE FOR REDUCING THE CAPACITIVE EFFECT BETWEEN DOPED AREAS AND A SUBSTRATE

BACKGROUND

The invention relates to an electro-optic modulation component, improved for better performance at data rates above 10 Gb/s. This improvement is obtained by reducing the influence of the capacitive effects of the structure and of its environment. More particularly, it relates to such a component in which:
- the influence of the capacitance of the structure itself is limited by reducing the access resistance, or
- the influence of the capacitive effect of the environment is reduced by modifying the structure of the substrate(s) plumb with the active region, or
- a combination of these features.

The invention furthermore relates to a process for manufacturing such a component and to a device or system that includes such a component.

TECHNICAL FIELD

The invention lies in the field of optoelectronics and semiconductor photonics, in particular for applications in the fields of optical telecommunications and of optical cross-connects in integrated circuits.

Electronic-optical conversion components are needed to produce a communication chain comprising both electrical signals and signals based on light in optical fibres or optical circuits.

The electro-optic modulator is an element that allows data to be transferred from an electrical signal to an optical wave, for example in order to convert digital data in electronic form into a digital optical signal which will be carried in an optical fibre for long-distance transmission.

The current generation of optoelectronic components and systems being marketed or in the process of being industrialized operate at a data rate ranging up to 10 gigabits per second per colour channel for silicon.

The next generation currently under consideration should operate at higher data rates, above 10 Gbit/s, for applications typically requiring 10 to 40 Gbit/s.

An aim of the invention is thus to improve the performance provided by these components, in particular from the point of view of the modulation rate and of the contrast obtained in the modulated optical signal, but also of the reduction of the optical losses.

Increase in the Data Rate

There are optical modulators that operate at more than 10 and up to 40 Gbit/s and that are produced from type III-V semiconductor materials and from lithium niobate (LiNbO3).

However, these components do not have the advantages of silicon modulators in relation to other technologies, i.e. in particular and for example: possibilities and simplicity of integrating the optics and the electronics on the same substrate, use of the existing microelectronics manufacturing means, minimal cost and flexibility and speed of control and development.

An aim of the invention is thus in particular to solve or to limit the problems associated with the increase in the data rate of the electro-optic modulators produced from semiconductor-on-insulator, and more particularly from silicon-on-insulator.

Silicon Modulators

In a silicon-on-insulator modulator, the optical modulation is generally produced by varying the density of carriers (electrons and/or holes) inside the optical waveguide. This variation in carrier density creates a variation in the refractive index, and therefore a variation in the phase of the guided optical wave according to a voltage applied from an electrical input signal.

An interferometric structure, which can be for example a Fabry-Perot type or ring resonator or a Mach-Zehnder interferometer, is used to convert the phase modulation into optical intensity modulation.

The Mach-Zehnder interferometer is formed of a beam splitter, splitting the beam into two paths in which the two waves propagate and in which the phase modulation is produced, and a beam combiner combining the beams coming out of these two paths. When the two waves recombine in phase, the intensity is greatest at the output of the interferometer, when the two waves recombine in phase opposition, the intensity is weakest.

In the light of the variations in the effective index that can be obtained (typically less than $10^{-3}$), the active regions positioned in the paths of the Mach Zehnder are several millimeters long in order to be able to obtain a phase variation equal to pi, and thus to provide good performances for example with regard to contrast.

Further reference is made in detail below to the following documents, which describe optical modulators on silicon-on-insulator type substrate:
document U.S. Pat. No. 7,251,408,
document WO 2005/093480, and
publication D. MARRIS-MORINI et al., "Low loss and high speed silicon optical modulator based on a lateral carrier depletion structure", Optics express, 16, 1, 334-339 (2008).

There are several publications on the subject of optical modulators on silicon-on-insulator type substrate that operate at data rates above 10 Gbit/s. However, the means used to achieve these data rates, for example for a reduction in the length of the active region, lead to limited performance of these components.

Thus, the publication L. Liao et al., "40 Gbit/s silicon optical modulator for high-speed applications", Electronics Letters, 43, (22) (2007) proposes a modulator that provides a modulation with a contrast of only 1 dB at 40 Gbit/s.

For its part, the publication S. Manipatrun et al., "High Speed Carrier Injection 18 Gb/s Silicon Micro-ring Electro-optic Modulator", LEOS 2007, 21-25 Oct. 2007 proposes a modulator based on a ring resonator that provides a modulation with a contrast of only 3 dB of modulation at 18 Gbit/s. Moreover, the ring modulator has drawbacks because it is for example more sensitive to temperature and to technological imperfections, and requires a particularly complex electrical power supply.

Another aim of the invention is thus to overcome the drawbacks of the state of the art, and in particular to:
make it possible to increase the modulation rate,
improve the contrast performances when the data rates are increased,
make it possible to improve the signal-to-noise ratio of the modulated signal,
limit the optical losses,
facilitate and simplify the development, industrialization and manufacture of the components or of the corresponding systems, improve and simplify the integration of the modulation function within compact and/or complex and/or hybrid circuits, in two dimensions and in three dimensions, make it possible to use all or some of the existing processes and facilities, make it possible to improve the transmission capabilities in optoelectronic circuits, including optical transmission lines, make these improvements usable in complex, compact and/or hybrid circuits, in particular with 3D integration.

SUMMARY

For this, the invention proposes an improved optoelectronic component for controlling an optical signal travelling in a micro-waveguide formed using a raised pattern, typically a raised rib (also called ridge) sticking out from the surface of a semiconductor layer within a semiconductor-on-insulator type substrate.

Typically, the semiconductor can be silicon on a layer of silica, for example in the form of an SOI ("Silicon-On-Insulator") type wafer supplied for example by the company SOI-Tec.

However, the invention can also apply to a modulator using other semiconductors, such as for example:

germanium (i.e.: germanium-on-insulator), or any type III-V semiconductor (i.e.: III-V-on-insulator).

It can also apply to a substrate with a more complex structure, such as:

III-V semiconductor on SOI (silicon-on-insulator), or

III-V semiconductor on GOI (germanium-on-insulator), or

SiGe-on-Si type, or SiGe-on-Ge type, heterostructure.

According to the Invention this micro-waveguide comprises an active area centred on the optical mode created by said ridge/rib and located between (and possibly included in) a P type doped area and an N type doped area, called main doped areas, forming a diode between them, and these P or N doped areas are connected to two electrodes arranged on either side of this active area and make it possible to polarize said diode.

The invention proposes to increase the cutoff frequency of such a component by modifying some of the electrical parameters that combine to bring it about, in a manner not expected by a person skilled in the art.

According to the invention, this cutoff frequency is increased:

by reducing the access resistances of the component in itself, or by reducing the influence of the capacitive effect that the immediate environment of the active region has, and preferably by combining these two actions, the effects of which advantageously combine to make it possible to increase the data rate.

In fact, the inventors noticed that the elevated frequency values needed to obtain the looked-for levels of data rates make these factors and this influence not insignificant, or even paramount compared with the other previously managed factors.

Access Resistances of the Component

For this, the invention proposes to reduce the access resistances, i.e. the electrical resistance between the electrodes (for example made of metal) of the diode and the active region (the N and P type doped regions within the diode, as well as any intrinsic regions). The reduction in these access resistances makes it possible to limit the harmful influence that the capacitive behaviour of the diode has in itself.

Usually, for example in document U.S. Pat. No. 7,251,408, the means used to reduce the access resistances of a diode consist of increasing the doping of the P and N regions of the diode. However, in the case of a modulator, it has been noted that a result of this method was an increase in the optical losses of the component.

Contrary to what would naturally happen in the state of the art, the invention proposes such a component in which at least one of these main doped areas (and preferably both) has an extra thickness in the part of it connected to its electrode compared with the part of it closest to said active area.

In this main doped area, for the material of the part connected to its electrode, this extra thickness thus creates an increase in the dimension transverse to the current travelling between the active area and the corresponding access electrode. This increase in the dimension transverse to the current reduces the overall value of the access resistance for this electrode.

In document WO 2005/093480, FIG. 1 describes an optical modulator constituted by a so-called vertical diode, formed between an Si $P^+$ doped layer at the bottom of a bowl of the silicon substrate and an Si $N^-$ doped layer carrying the ridge and extending over the top of the component to an electrode. This Si $N^-$ layer has a part that rises perpendicularly to the plane of the substrate, but the dimension of which transverse to the current (i.e. the dimension parallel to the plane of the substrate) is approximately identical to the dimension transverse to the other parts of this Si $N^-$ layer.

In a different way, the feature of extra thickness proposed by the invention is advantageously implemented according to a dimension transverse to the direction of travel of this current, including in configurations where this direction is not parallel to the plane of the substrate.

According to the invention, this transverse dimension can also be obtained by increasing the horizontal dimension of the part of the main doped area connected to its electrode compared with the part of it closest to the active area. The invention also provides for a combination of this extra thickness and this increase in horizontal dimension, determined from the geometry and the proportions of these different parts.

The invention thus describes an original manner of reducing the access resistances by increasing the thickness of the doped silicon regions, in particular in the case where a lateral diode is used, but also for other configurations such as a so-called vertical diode for example. This increase in thickness is brought about only from a minimum distance from the core of the guide in order not to influence the propagation of the optical mode too much and therefore to retain low propagation losses.

This minimum distance depends on the effective dimensions of the area containing the optical mode, and therefore on the containment parameters for the optical guide and its environment.

It can be determined by tests or measurements relating to the objectives looked for during the design of the component, in particular regarding the following criteria:

power losses in the guide or maximum intensity of the electromagnetic field in the diode per linear meter.

A larger distance between the optical mode and the rise of the extra thickness area will give lower losses, while reducing the contrast performance of the modulator. This minimum distance will therefore correspond to a distance chosen with the lowest possible value for which the losses remain acceptable in relation to the specifications.

Thus, the increase in thickness of the doped areas will be able to be located at least at a distance from the core of the guide at which the intensity of the field is less than a tenth of the maximum intensity of the field, i.e. at least at a distance for which I<Imax/10. Preferably, a distance such that I<Imax/100, or even I<Imax/1000, will be chosen.

It is to be noted that this extra thickness and the associated differences in level represent a complexity, constraints and/or an additional cost for the compaction and the integration, which would normally constitute an incentive to avoid this type of solution.

Document U.S. Pat. No. 7,251,408 moreover discloses a component that illustrates this counter-incentive tendency, in which the surface of the doped parts of the active region is etched in order to receive electrodes in the form of implants integrated into the doped part. These implants are integrated so as not to stick out from the surface of the silicon of the waveguide layer, nor at the level of the waveguide ridge nor even around this ridge.

Influence of the Capacitive Environment

In combination with or as an alternative to this reduction in the access resistance(s), the invention moreover proposes to reduce the influence of the equivalent capacitance (in the sense of the capacitance of a capacitor) formed by the immediate environment of the active region of the component. It proposes to reduce this influence by reducing the value of this capacitance, or by increasing the resistance of the substrate, and preferably by combining these two features.

According to the invention, such a component is produced within a substrate chosen or modified in order to reduce the influence of the capacitive effect formed around the diode, and in particular between, on the one hand, the main doped areas and, on the other hand, the substrate layer located on the other side of the insulator layer and in particular below the latter.

Note Regarding the State of the Art:

In a document (US 2002/071621) relating to a modulator of a different type, with two vertical diodes connected to each other that rest directly and without insulator on a semiconductor substrate, a groove (74, FIG. 8) that passes through one of the doped layers in order to penetrate the semiconductor substrate is described. This optical modulator is formed by two vertical diodes (20 and 26) based on InP. These diodes are connected in series by a shared layer (14) of N-doped InP, which is deposited directly on an InP+Fe semiconductor substrate (12). The whole is covered by an insulator layer (36a, 36c).

This groove (74) is parallel to and outside of the diodes and makes it possible (§[106]) to interrupt the doped layer (14), in order to insulate the outer doped part (14p) from the rest of the doped layer (14) located between the two diodes. This interruption makes it possible to decouple their respective potentials, and thus to reduce the capacitance (cj1 and cj2, FIG. 11) of these two diodes (20 and 26).

In fact, the teaching of this document aims to reduce the static capacitance of the modulator (§[011] last sentence), i.e. its internal capacitance as a component within an electronic circuit (cf. FIG. 11).

In this disclosure, it is noted that another result of the presence of this groove (74) is to create an additional capacitive effect between the outer doped layer (14p) and the rest of the active doped layer (14) located in the component. The effect of this groove is therefore also to increase the capacitance existing between the component itself and its external environment (among others the layer 14p).

Unlike in the invention, this groove therefore does not constitute a modification likely to reduce the capacitive influence of the environment. This document describes a component formed directly on a semiconductor substrate, without an insulator layer between the two. Therefore, a fortiori, it does not disclose a modification likely to reduce the capacitive effect formed between the main doped areas and a substrate layer located on the other side of an insulator layer.

The teaching of this document is therefore significantly different to the features proposed by the invention, in which modifications of the substrate are proposed so as to reduce the capacitive influence of the environment, i.e. so as to reduce the capacitance between the component and the outside.

Thus, it is noted that the aim looked for by this document is different to the objectives of the invention, and that the effect obtained by the teaching of this document runs counter to the objectives of the invention.

More particularly, the invention proposes different possibilities that can be combined with each other in different ways:

Increase in the Resistance of the Substrate

According to a first possibility, the semiconductor of the substrate located below the insulator is chosen or modified in order to have a high or higher resistance.

This increase in resistance can be obtained in particular according to the following methods, which can be combined with each other:

by removing or by thinning the semiconductor of the substrate located below the insulator, in all or some of the area located plumb with the doped or intrinsic area(s) forming the diode.

by choosing or by modifying the semiconductor in order that it has a high or higher resistivity, uniformly or in all or some of the area located plumb with the doped or intrinsic area(s) forming the diode, or the electrodes, or both.

Standard silicon substrates not intentionally doped generally have a residual doping level of the order of about $10^{15}$ $cm^{-3}$, which gives them a resistivity lying in the region of 10 to 20 $\Omega cm$ (ohm centimeters).

In the case of silicon, the invention proposes to use, at least for this part of the substrate, a silicon having a resistivity of at least 100 to 200 $\Omega cm$, or even above 500 $\Omega cm$. Thus, good results are provided with a substrate of high resistivity having a value of the order of 750 $\Omega cm$. Until now, this feature was not identified as significant for the objectives aimed at here. Such substrate features were known in themselves, but were thus not looked for specifically for the present application.

The invention thus proposes to select this substrate specifically in order that it has such a resistivity.

Alternatively or in combination, the invention also proposes to carry out one or more stages of increasing this resistivity, for example a purification, if possible, but not necessarily, above the values cited above.

Increase in the Insulation

According to a second possibility that can be advantageously combined with the first one, the insulator layer is chosen or modified in order to have a greater thickness than what was judged to be sufficient until now. This thickness can be for example at least 2 micrometers and preferably at least 3 micrometers, or even more than 4 micrometers.

Such thicknesses are currently producible in the field of SOI type substrates, but for different uses and at higher costs which until now had been a deterrent to their being looked for specifically due to a lack of established advantages. This is why the substrates used are currently of a variable or even random thickness according to the availabilities. This thickness was until now considered to be sufficient in order to avoid the losses of light from about 1 micrometer of insulator for the current applications of optics. The thicknesses used most commonly are thus comprised of 1 and 2 micrometers.

According to a third possibility, the insulator is thinned or taken away, partially or completely, in at least one part of the area located plumb with the doped or intrinsic area(s) forming the diode.

Top Layers

It is to be noted that these different possibilities for processing the substrate can also be applied to all or some of the layers which come to cover the active region, for example by subsequent deposition or after assembly with another circuit or substrate, as in the case of a "3D integration" type process.

A "three-dimensional" integration consists of combining different types of functional components in the same hardware component or the same integrated circuit, by producing their constituent parts on different levels that can possibly communicate with each other.

Such an integration can comprise the production of a first functional component on a substrate, then the production of new layers on this first component in order to produce a second functional component.

Another method comprises the production of two components or groups of components on two different substrates, then the head to tail assembly of one on top of the other by their upper surfaces.

The different features of the invention disclosed here can advantageously be applied to the design of one or more components assembled in this way.

Within the meaning of the invention, the features disclosed as applying to the environment of the diode (processing of the insulator and/or of the substrate) also extend to the layers or regions which enter this environment, including after such an assembly.

The insulator or substrate layers located "on top" (in relation to the initial substrate of the component) are also advantageously processed as described above: i.e. by increase in the resistivity or even partial or complete removal for the substrate, and/or by increase in the thickness or even partial or complete removal for the insulator.

Performance

The invention thus offers solutions that make it possible to achieve data rates above 10 Gbit/s, while having "good" modulation properties, and in particular a strong contrast between the high and low levels at the output of the modulator, as well as low optical losses.

By way of comparison, the inventors have obtained digital simulation results that lead to a contrast of at least 5 dB, or even 10 dB or more, being predicted at a frequency corresponding to a data rate of 40 Gb/s with a Mach-Zehnder interferometer, i.e. a factor of five or even ten (in decibels) compared with the contrast of 1 dB stated in the L. Liao et al. publication.

The inventors have thus established that it was important to design electrodes that make it possible to correctly propagate the hyperfrequency wave with a low attenuation all along the device.

In fact, at the frequencies and data rates being considered (higher than 10 Gbit/s), the electrical voltage is not applied simultaneously on the whole of the component: it is in fact a hyperfrequency wave, the wavelength of which is of the order of magnitude of the length of the device.

Preferably, the two main doped areas have an extra thickness in the part of them connected to their respective electrode compared with the part of them closest to the active area, this extra thickness being covered, entirely or partially, by a layer forming the lower part of said electrode or in contact with it.

According to a particular feature, these electrodes can thus be coplanar with, and for example deposited on, the surface of the component. They thus allow a low attenuation all along the linear waveguide.

In the case of a horizontal diode, these extra thicknesses can for example be produced simply by an etching located on either side of the optical mode. The edges of this etching then form, on the one hand, the sides of the guide rib and, on the other hand, the rises of the extra thicknesses of the main doped areas.

All of these features apply to many configurations, and in particular to the following configurations in which:

the main doped areas are separated by an area of a semiconductor not intentionally doped in the majority of it, called intrinsic area, and together form a PIN type diode; or the intrinsic area moreover comprises at least one P or N type doped area forming a horizontal or vertical flat layer (or, more generally, a flat layer parallel to a plane separating the main doped areas from each other), called doping plane; or the main doped areas of the diode are located on either side of the centre of the active area in relation to a plane normal to the plane of the substrate (and parallel to the waveguide), called lateral or horizontal diode, this diode comprising an intrinsic area with at least one vertical doped plane; or the main doped areas of the diode are located on either side of the centre of the active area in relation to a horizontal plane (i.e. parallel to the plane of the substrate), called vertical diode, this diode comprising an intrinsic area with at least one horizontal doped plane; or the diode is of PIN type with a single doped plane; or the main doped areas are in contact with each other in a so-called junction area and together form a PN type diode.

The above features can be advantageously combined with all the configurations of diodes known for such electro-optic modulators. Even if all of these combinations cannot be described exhaustively here in detail, they are explicitly envisaged here.

Thus, the features described here for the main active areas can be applied to the P doped areas, or to the N doped areas, or also to both.

They can also be applied to the configurations with P doping plane, but also to those with N doping plane.

The features of processing the substrate in order to limit the capacitive effects can be applied to the lateral/horizontal diode configurations, but also vertical diode configurations. More particularly in the case of the vertical diode, these features can also be applied to the main regions located around the diode, in a horizontal plane (parallel to the plane of the substrate).

Within the same meaning, the invention proposes a manufacturing process combining known technologies devised for the production of a component such as defined above.

More particularly, this process comprises the production of a waveguide layer so as to obtain:

a determined thickness (for example complying with or less than the values previously used for the production of an electro-optic modulator) in the active region of the waveguide, and a thickness significantly greater than in the active part of the waveguide in at least one part of at least one of the main doped regions.

These differences in level can be produced for example:
by growth of the waveguide layer, by arranging reserves in the areas having to be less thick, or
by etching the waveguide layer, by arranging reserves in the areas having to be thicker,
or a combination of the two.

More particularly, the invention proposes such a process comprising the use of a substrate or of surrounding layers (above and/or below) of a semiconductor with a resistivity above 100 or even 200 ohms·m (or even above 500 or 750 ohms·m): in order to reduce the capacitive influence of said substrate on the modulation diode of said component.

The invention moreover proposes such a process comprising at least one integration of the component in a complex or compact or hybrid circuit by a process of the "three-dimensional integration" type. This manufacturing process then comprises the production of the component as disclosed here on a circuit or substrate part which will subsequently be assembled and/or superimposed with another circuit or substrate part, according to known methods.

According to the invention, such a process can comprise for example:
a covering of said component by one or more layers forming at least one component with a different function,
an assembly with one or more layers forming at least one component with a different function, or
a combination of these methods with each other or with others.

Within the same meaning, the invention moreover proposes a device for controlling an optical signal from an electrical signal, comprising at least one control component such as disclosed here.

According to a particular feature, the control component in it is used to produce a phase modulation in an optical signal injected at one end of the micro-waveguide of said control component, by applying the electrical signal to the electrodes of the diode of said control component.

Preferably, the control component comprises a PN diode, or a PIN diode without doped plane in its intrinsic region, or a PIN diode with at least one doped plane in its intrinsic region, said diode being used in depletion type mode.

Alternatively, the control component comprises a PN diode, or a PIN diode without doped plane in its intrinsic region, said diode being used in carrier injection type mode.

The invention thus proposes such a device using at least one such control component to produce an intensity modulation in an optical signal.

More particularly, the device uses at least one such control component to produce a phase modulation in an optical signal, preferably within a Mach-Zehnder type interferometric device set up to convert said phase modulation into an intensity modulation of said optical signal.

The Mach-Zehnder interferometer has several advantages, because it offers a low sensitivity to technological variations and to temperature. Moreover, its structure in terms of length lends itself particularly well to the integration of the features disclosed here, in particular the difference in level around the active region.

Such a device can also use such a control component to produce a phase modulation in an optical signal within a Fabry-Perot resonator or a ring resonator set up to convert said phase modulation into an intensity modulation of said optical signal.

The invention can be used in all the applications requiring an optical modulation from electrical signals at a high data rate, and in particular in optical telecommunications applications, optical cross-connects in microprocessors and biophotonics.

Various embodiments of the invention are provided for, integrating, according to all of their possible combinations, the different optional features disclosed here.

BRIEF DESCRIPTION OF THE DRAWINGS

Other characteristics and advantages of the invention will become apparent from the detailed description of an embodiment which is in no way limitative, and the attached drawings in which.

DETAILED DESCRIPTION

Figure 1:
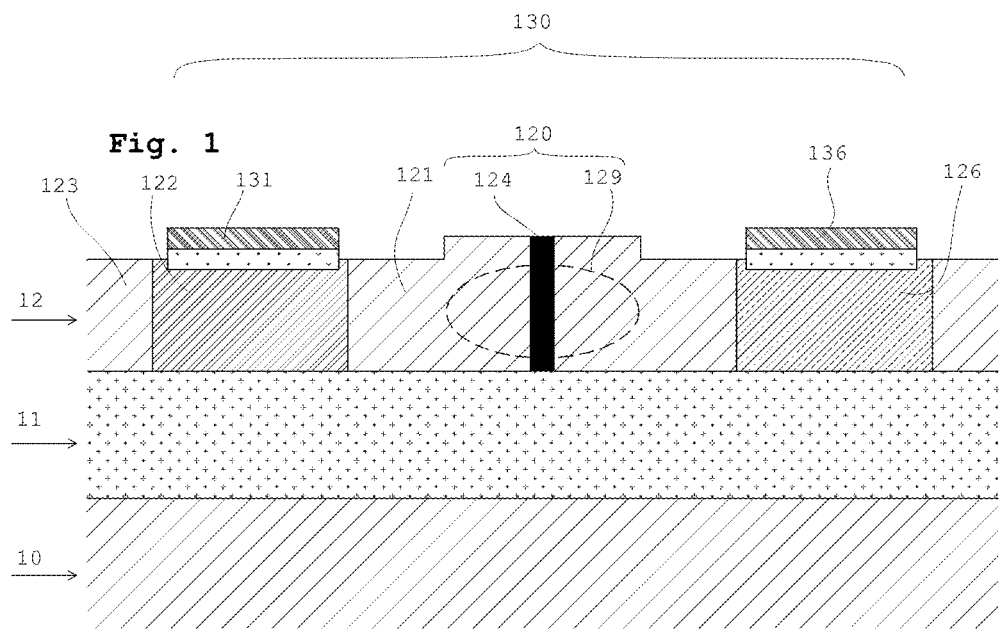
FIG. 1 is a transverse cross-section illustrating an example of the prior art comprising a PIN type diode in lateral configuration with a vertical doped plane in its intrinsic region, such as illustrated in document WO 2005/093480.
Figure 2:
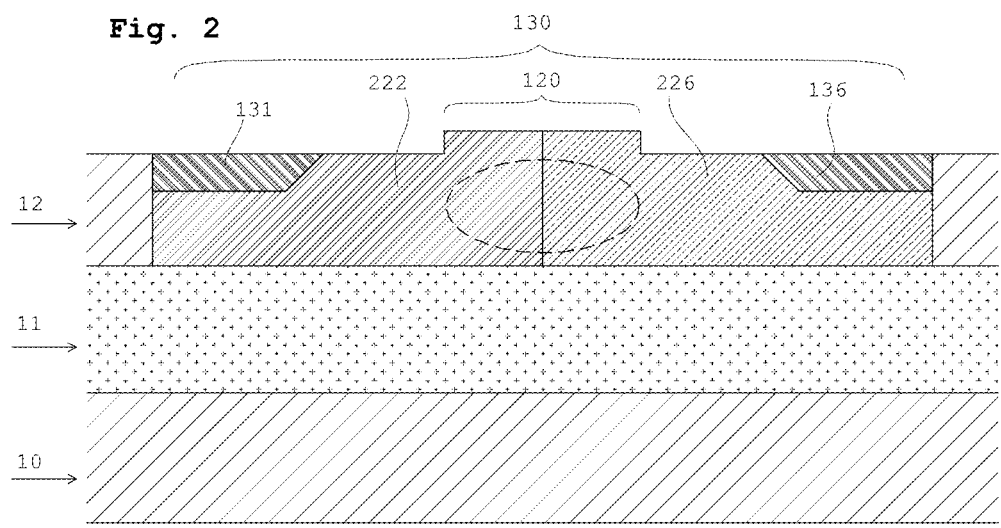
FIG. 2 is a transverse cross-section illustrating an example of the prior art comprising a PN type diode in lateral configuration, such as disclosed in document U.S. Pat. No. 7,251,408.

The current state of the art comprises silicon electro-optic modulators comprising a linear region forming a waveguide, such as illustrated in the diagrams of FIG. 1 and FIG. 2 according to cross-sections transverse to the direction of the linear waveguide. These figures represent types of modulators such as taught respectively by:

FIG. 1: WO 2005/093480 and publication D. MARRIS-MORINI et al., "Low loss and high speed silicon optical modulator based on a lateral carrier depletion structure", Optics express, 16, 1, 334-339 (2008);

FIG. 2: U.S. Pat. No. 7,251,408.

The waveguide is produced within the thickness of a monocrystalline silicon layer 12 forming a flat waveguide and carried by an insulator layer. This component is typically produced on an SOI ("Silicon-On-Insulator") type substrate: the silicon waveguide layer 12 then rests on a silica ($SiO_2$) layer 11, which itself rests on a silicon layer 10.

The linear waveguide is obtained for example by a rib 120, also called a ridge, jutting out from the upper surface of the waveguide layer 12. The difference in thickness of the rib 120 creates a guiding of the light in the region 129 that it overhangs. In this region 129 with an approximately oval cross-section, an optical mode characterized by its effective propagation index propagates, which produces a linear guiding of the light waves that are injected there.

The silicon waveguide layer 12 is processed in order to produce a linear diode 130 surrounding and/or including the region of the linear waveguide 129. This diode 130 is formed by doping the semiconductor in order to obtain regions having, respectively, an excess of holes (positively charged: P type doping 122) and an excess of electrons (negatively charged: N type doping 126), here the two regions 122 and 126 surrounding the guide region 129. In the example of FIG. 1, the diode moreover comprises an approximately central intrinsic region 121 which is not intentionally doped, forming a PIN type diode. In this example, this intrinsic area moreover includes one or more doped areas forming one or more flat layers 124, forming a PIN type diode with doping plane. In the example of FIG. 2, the two doped regions 222 and 226, respectively P and N, come together and form a PN type diode.

The electrical signal to be converted is applied to the terminals 131 and 136 of this diode, which modifies the effective refractive index within the region of the linear waveguide 129 according to the applied signal. This modification of the effective index creates a modification of the transmission of the light waves which pass through the waveguide, in the form of a phase shift depending on the applied electrical signal.

By injecting a regular or known light wave coming from a light source S, for example a laser, at one end of this linear waveguide, an optical signal the phase of which is modulated according to the electrical signal is obtained at the output.

This phase modulation can then be integrated within an optical circuit in order to provide an intensity modulation, for example within a Mach-Zehnder type interferometer or within a Fabry-Perot type resonator or a ring resonator.

Figure 3:
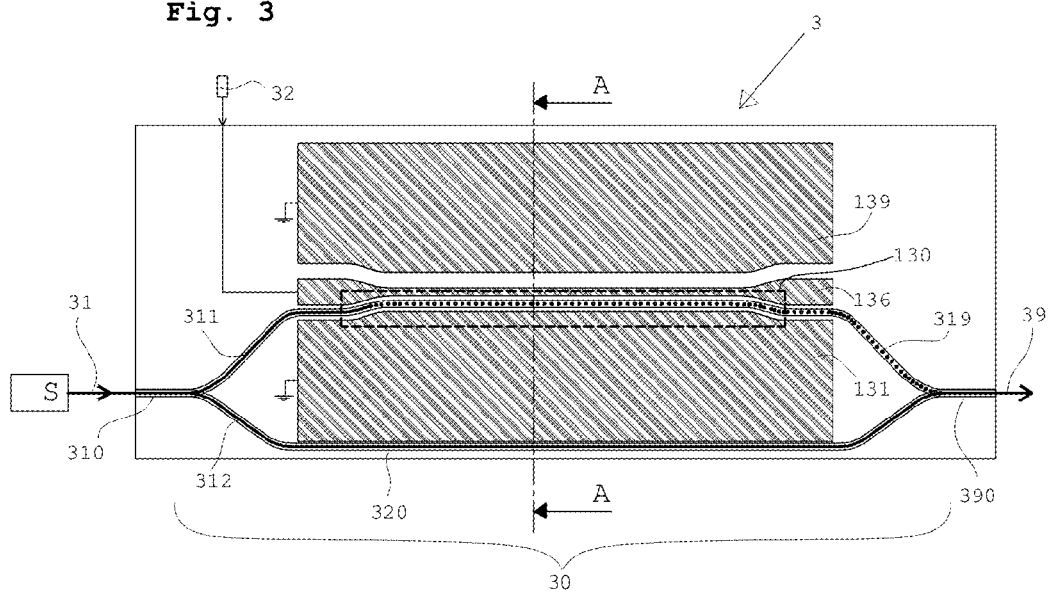
FIG. 3 illustrates an example of installation and operation of a phase variation modulator fitted in an asymmetric Mach-Zehnder interferometer.

As illustrated in FIG. 3, this linear diode 130 can be installed in an optical circuit 30 forming a Mach-Zehnder interferometer, in order to produce a phase variation modulator 3.

The electrical signal 32 with respect to earth is applied to an electrode 136, the other electrode 131 being connected to earth. The electrode 136 receiving the signal 32 is located centrally between the earth electrode 131 and another earth electrode 139 which is approximately symmetrical to it.

A light source S, for example a laser, produces a light wave 31 which is injected at one end 310 of the optical circuit.

A part 311 of this wave 310 is injected into the linear waveguide 120 of the diode 130, and provides, at the output, an optical signal 319 the phase of which is modulated according to the electrical signal 32.

Another part 312 of the light wave 31 is injected into another optical guide 320 of the same length, and emerges from it unchanged.

The two parts 311, 312 are merged at the output 390 and interfere with each other in order to produce a light wave 39 the intensity of which varies according to the electrical signal 32.

Figure 4:
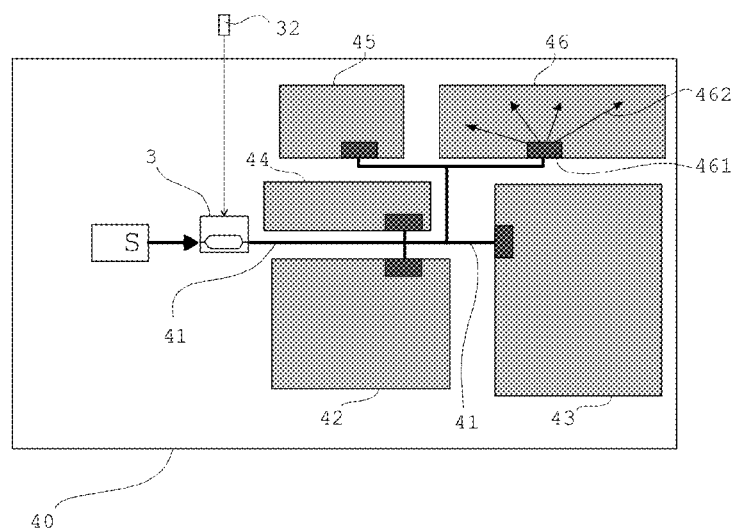
FIG. 4 illustrates an example of installation and operation of the modulator of FIG. 3 in an optical circuit transmitting according to an electronic input signal, within a microelectronic circuit comprising an optical distribution.

FIG. 4 represents an embodiment example of an optical modulator, according to the invention or according to the prior art, in a circuit within a microelectronic or micro-optronic circuit.

The electrical signal 32 is injected into the modulator 3, in order to provide an optical signal which is carried in an optical distribution circuit 41 formed on a plate 40, for example of SOI. This plate constitutes an optical integrated circuit comprising different functional blocks 42 to 46, themselves comprising an electrical distribution 462 from a photodetector 461 at the input.

FIG. 5 to FIG. 18 describe different embodiment examples of the invention corresponding to different possible combinations of the features of the invention, and variants of these features. Although an exhaustive disclosure of all of the combinations of these variants may not be possible here, all of these possible combinations are explicitly proposed by the invention here.

In particular, the relative positioning of the extra thicknesses, the limits of the doped areas, the electrode limits, as well as the existence or not of intrinsic area or doping plane or progressive doping areas, as well as the existence and the nature of the modified insulator or substrate areas, are features which can be combined with each other differently according to the needs of the design specifications, while benefitting from the advantages of the invention and without exceeding the meaning of the invention.

The known etching or depositing or growth technologies, for example those cited in document WO 2005/093480, can be used for the production of the different elements described here. They therefore will not be described or specified here. The geometric characteristics of the invention are then obtained by modifying the patterns or the parameters used in these technologies, in a manner which depends directly and clearly on the final forms described here.

Access Resistance of the Component

Figure 5:
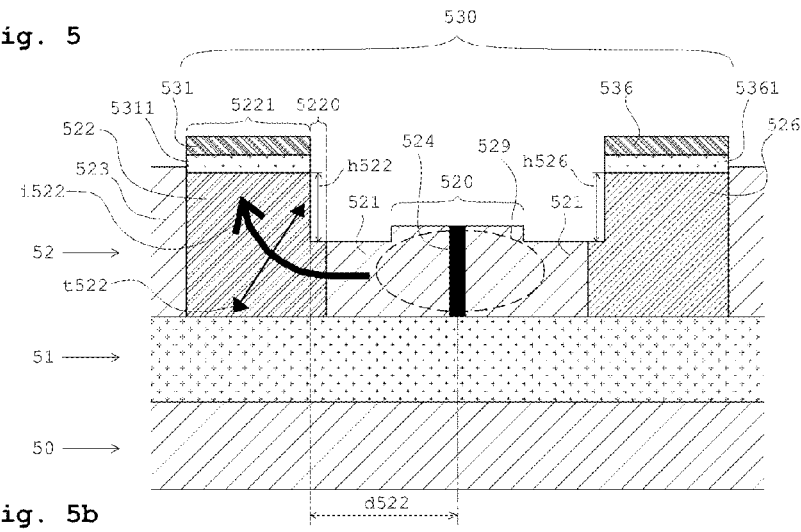
FIG. 5 is a transverse cross-section illustrating an embodiment example of the invention with extra thickness towards the top of the main areas, in a lateral PIN type configuration with vertical doped plane.
Figure 5B:
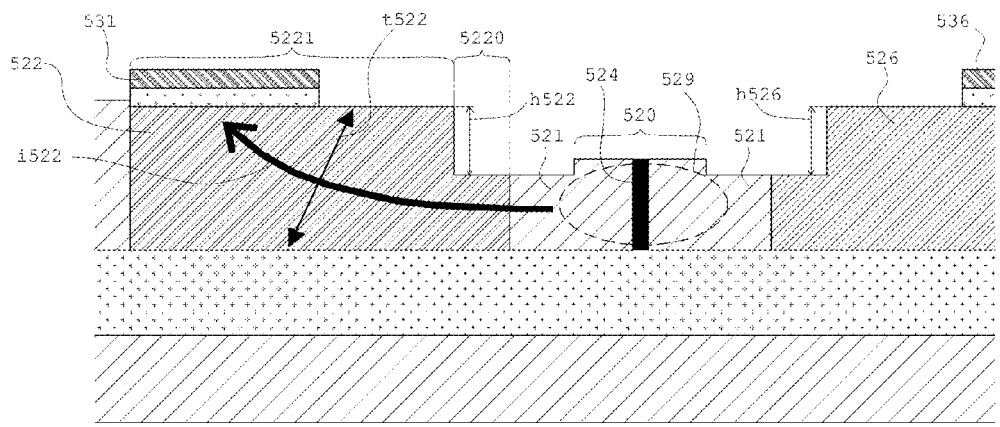
FIG. 5b is a similar view to FIG. 5, illustrating the operation of the extra thicknesses reducing the access resistances, for main doped areas with slightly different proportions, in a partial view centred on the left-hand part of the figure.
Figure 6:
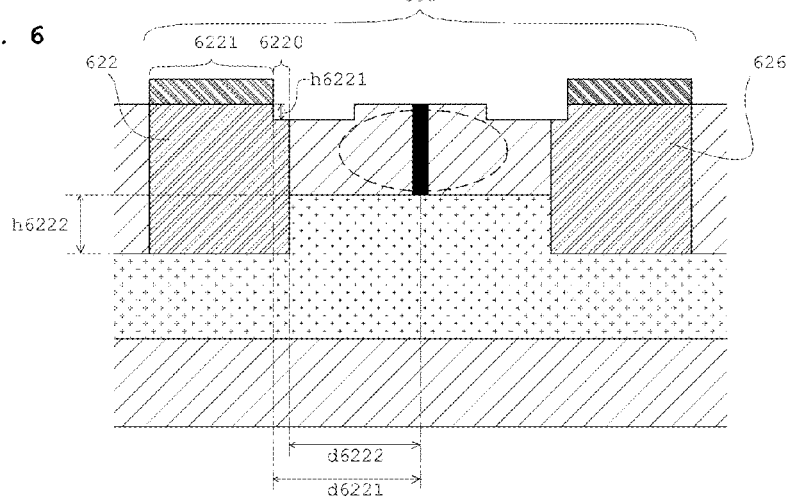
FIG. 6 is a transverse cross-section illustrating an embodiment example of the invention with extra thickness of the main areas towards the top and towards the bottom, and where the upper surface of the extra thicknesses is coplanar with the surface of the guide rib and with the general surface of the component in a PIN type lateral configuration with vertical doped plane.

FIGS. 5, 5b and FIG. 6 illustrate two embodiment examples of the invention in a PIN type lateral configuration with vertical doped plane.

The waveguide is produced within the thickness of a monocrystalline silicon layer 52 forming a flat waveguide and carried by an insulator layer. This component is produced for example on an SOI ("Silicon-On-Insulator") type substrate: the silicon waveguide layer 52 then rests on a silica ($SiO_2$) layer 51, which itself rests on the rest of the silicon layer 50 of the original substrate.

The linear waveguide is obtained for example by a rib 520, also called a ridge, jutting out from the upper surface of the waveguide layer 52. The difference in thickness of the rib 520 creates a guiding of the light in the region or active area 529 that it overhangs. In this region 529 with an approximately oval cross-section, an optical mode characterized by its effective propagation index propagates, which produces a linear guiding of the light waves that are injected there.

The silicon waveguide layer 52 is processed in order to produce a linear diode 530 (seen here in transverse cross-section) surrounding and/or including the region of the linear waveguide 529. In this example, the linear diode 530 is of PIN type, and formed of two main doped parts 522 and 526, P and N doped respectively. These two parts 522 and 526 surround an intrinsic area 521 not intentionally doped, which includes one or more doped areas forming one or more doping planes 524, of P or N type according to the desired configurations.

In the embodiment of the invention of FIG. 5 and FIG. 5b, the main doped parts 522 and 526 each have an outer area 5221 distanced from the optical mode 529, and an inner area 5220 located on the side of the optical mode 529.

In a direction transverse to the direction of travel of the currents i522 flowing through the doped part 522 between the active area 529 and the corresponding access electrode 531, the outer area 5221 exhibits an increase in the thickness t522 of material through which these currents pass.

In order to obtain this increase in the thickness t522 of passed-through material, the outer area 5221 exhibits for example an extra thickness of a difference in level h522 in relation to the inner area 5220, making it possible to reduce the access resistance of the diode on the side of the main doped area concerned, preferably for the two main doped areas 522 and 526.

This difference in level h522 located at a distance d522 from the centre of the optical mode 529, calculated or tested in order not to influence the propagation of the optical mode too much and therefore to retain low propagation losses. This distance is chosen as small as possible in order to reduce the access resistances as much as possible, while remaining of sufficient minimum value, measured or tested, in order not to disrupt the optical transmission too much nor to increase the optical losses in the diode too much.

The electrical signal to be converted is applied to the terminals of this diode 530 by, for example metallic, electrodes 531 and 536. These electrodes are arranged on the upper surface of the main doped areas 522 and 526, over all or some of their extra thickness part 5221.

In the example of FIG. 5, an intermediate silicide layer 5311 and 5361, for example of nickel or of platinum, is provided for between these electrodes 531 and 536 and the doped silicon of their corresponding main doped part 522 and 526, in order to improve the electrical contact.

In this same example, it is seen that the extra thickness h522 for improving the access resistance of the main doped parts 522 and 526 is arranged only towards the top, i.e. on the side opposite the base substrate 50.

In other embodiments, this extra thickness can be located towards the bottom, i.e. below the central part of the diode, and even, as here, distributed on both sides.

The free space above the waveguide 520 is here left empty, but can also be covered with an insulator such as silica $SiO_2$, for example for reasons of protection or of insulation.

FIG. 6 represents an example similar to FIG. 5, in which the extra thicknesses for improving the access resistance of the main doped parts 622 and 626 are distributed in an upper difference in level h6221 above the central part, and a lower difference in level h6222 below this central part. These two upper and lower differences in level can be located at the same distance from the core of the guide, but also at different distances d6221 and d6222 from this core, as illustrated here.

Figure 7:
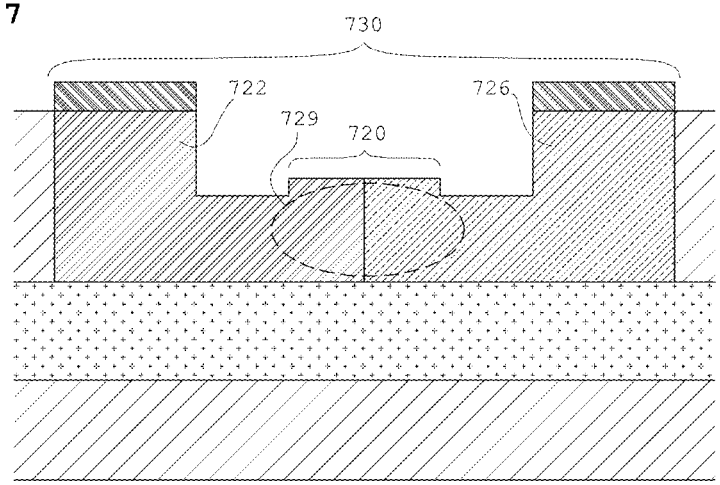
FIG. 7 is a transverse cross-section illustrating an embodiment example of the invention with extra thickness towards the top of the main areas, in a PN type lateral configuration.

In FIG. 7, an embodiment of the invention applied similarly to FIG. 5 but for a PN type diode is illustrated, where the two main doped parts 722 and 726 come together at the centre of the guide rib 720 of the optical mode 729.

Figure 8:
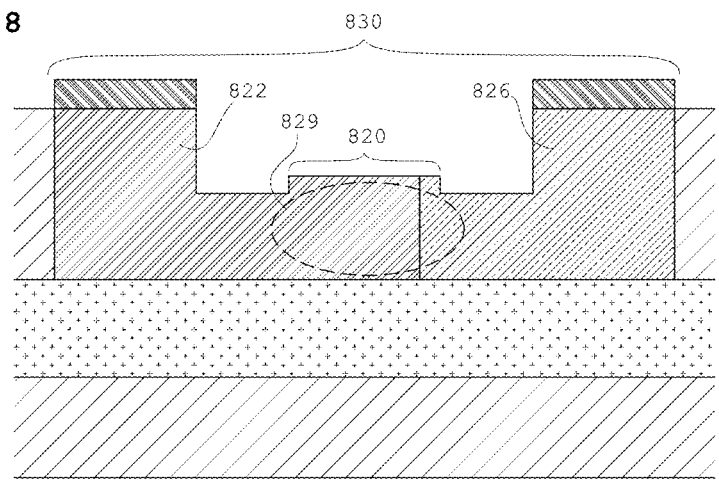
FIG. 8 is a transverse cross-section illustrating an embodiment example of the invention with extra thickness towards the top of the main areas, in a non-symmetric PN type lateral configuration.

FIG. 8 illustrates an embodiment example of the invention similar to that of FIG. 7, but in which the two main doped parts 822 and 826 are not symmetrical and come together under the guide rib 820 of the optical mode 829 but on the side of this rib.

Figure 9:
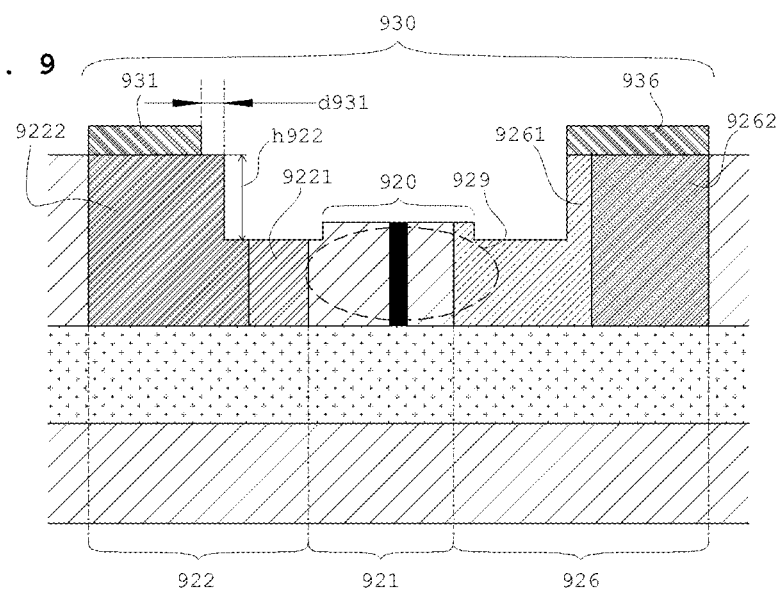
FIG. 9 is a transverse cross-section illustrating an embodiment example of the invention with extra thickness towards the top of the main areas, in a non-symmetric PIN type lateral configuration with two doping levels of the main areas and a single vertical doped plane in the intrinsic region.

FIG. 9 illustrates an embodiment example of the invention similar to FIG. 5, but in which the main doped areas each have two different doping areas, which are moreover distributed asymmetrically.

The main doped area 922 located on the left of the figure, for example of P type, is distributed in an outer area 9222 completely spanning the extra thickness and doped more strongly than an inner doped area 9221, which is in contact with the intrinsic area 921 outside the guide rib 920 of the optical mode 929. Moreover, the access electrode 931 to this main doped area 922 covers only a part of the extra thickness and stops at a certain distance d931 from its difference in level. The access electrode 931 is therefore thus more distanced from the active area 929 than this difference in level h922, by the value of this distance d931.

On the right of the figure, the main doped area 926, for example of N type, is distributed in an outer area 9262 doped more strongly than an inner doped area 9261, which is in contact with the intrinsic area 921 under the guide rib 920 but on the side of the latter. Moreover, the inner area 9261 spans a part of the extra thickness and thus comes into contact with the corresponding electrode 936.

Figure 10:
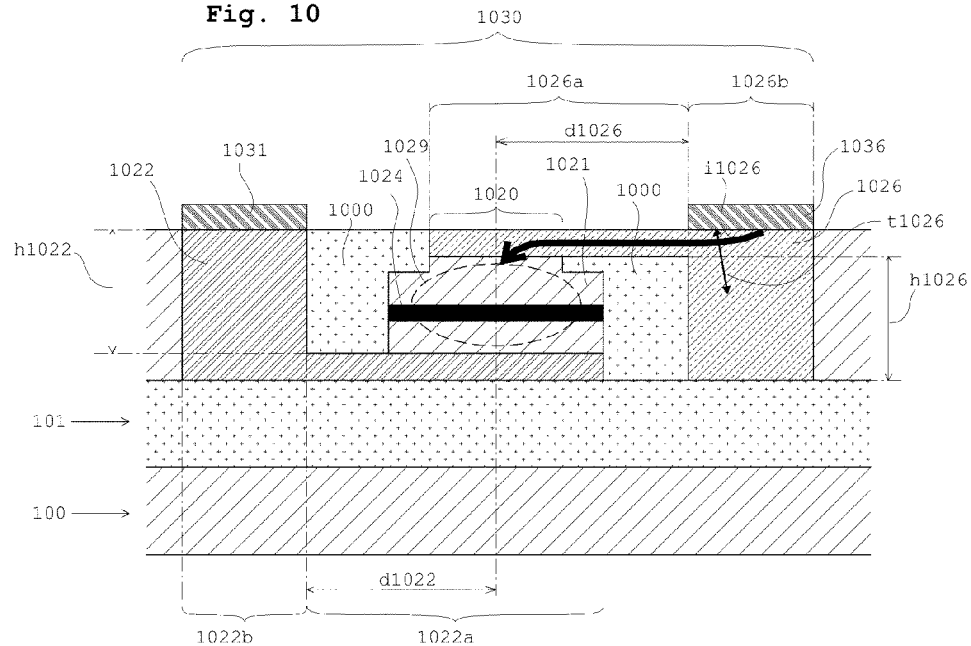
FIG. 10 is a transverse cross-section illustrating an embodiment example of the invention with extra thickness of the main areas, in a PIN type vertical configuration with horizontal doped plane.

FIG. 10 illustrates an embodiment example of the invention, in a PIN type vertical configuration with horizontal doped plane 1024. This example comprises a linear diode 1030 with extra thickness of the main doped areas 1022 and 1026.

The optical guide comprises a rib 1020 formed by a drastic narrowing of the width of an intrinsic part 1021 not intentionally doped, in its upper part.

This intrinsic area comprises a single horizontal doped plane 1024 and is surrounded on the sides by an insulator 1000. It is in contact with the main doped areas 1022 and 1026 by its lower and respectively upper surface.

On the left-hand part of the figure, the main doped area 1022, for example of P type, has a inner part 1022a in contact with the underneath of the intrinsic area 1021. At a distance d1022 from the centre of the optical mode 1029, the main doped area 1022 has a difference in level h1022 forming an extra thickness extending upwards in an outer part 1022b, and on the top of which the electrode 1031 is arranged.

On the right-hand part of the figure, the main doped area 1026, for example of N type, has an inner part 1026a in contact with the top of the rib carried by the intrinsic area 1021. At a distance d1026 from the centre of the optical mode 1029, the main doped area 1026 has a difference in level h1026 forming an extra thickness in an outer part 1026b, on the top of which the electrode 1036 is arranged. This extra thickness extends downwards, and goes down here to the surface of the insulator layer 101, for example the silica of an SOI substrate formed from an initial silicon substrate 100.

For each of the main doped areas 1022 and 1026, the extra thickness created by the difference in level h1022 in the outer part 1026b makes it possible to increase the width t1026 of material through which the currents i1026 travelling between the active area 1029 and the corresponding access electrode 1036 pass.

By way of comparison, in the prior art described by document WO 2005/093480, the two main doped parts had a constant thickness. An electrode had a sinking part which went down to the surface of the main doped part located at the bottom of the intrinsic part, this doped part having a constant thickness. The other main doped part had a constant thickness on the top of the intrinsic part.

Figure 11:
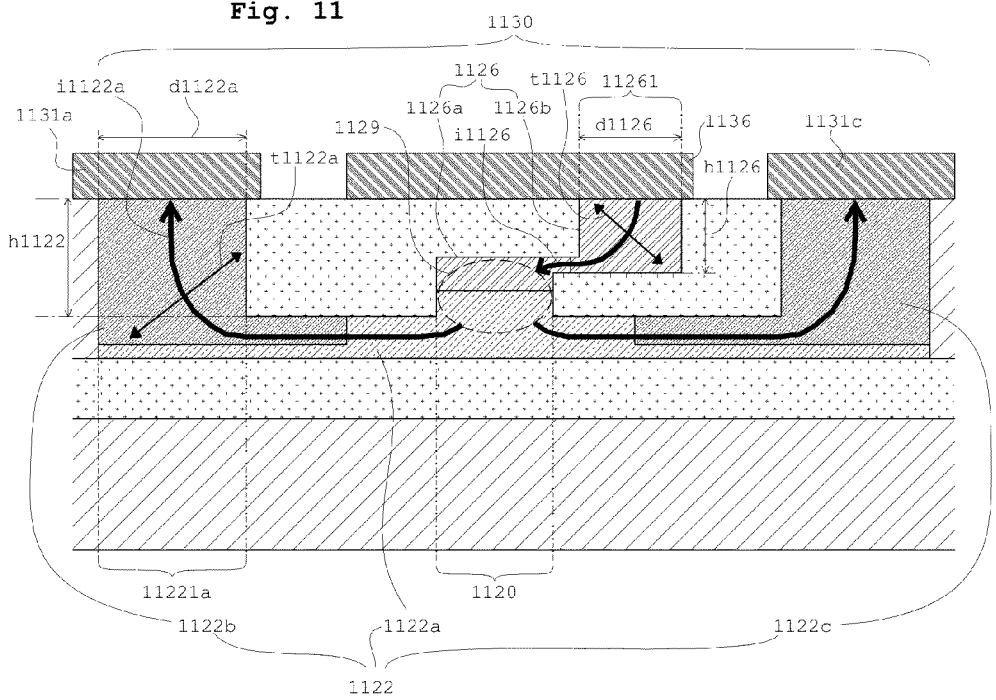
FIG. 11 is a transverse cross-section illustrating an embodiment example of the invention with extra thickness of the main areas, in a PN type vertical configuration with two doping levels of the main doped areas.

FIG. 11 illustrates an embodiment example of the invention with extra thickness of the main areas, in a PN type vertical configuration with two doping levels of the main doped areas.

The two main doped parts of the diode 1130 merge in a region or rib 1120 of approximately rectangular section, forming a guide for the optical mode 1129.

The lower side of this junction is formed by a main doped part 1122 called lower, for example of P type, extending horizontally from the two sides below the rib 1120. On each side of the guide region 1120, this main doped part 1122 has a difference in level h1122 forming an extra thickness rising to the surface of the component, and on which an electrode 1131a and 1131c is arranged.

Optionally, this lower main doped part 1122 has two different doping levels: the central part 1122a has a first doping level extending to the lateral ends for its lower part. The two outer parts 1122b and 1122c of this main part 1122 have a second, stronger, doping level able to start in the part before the difference in level h1122.

The upper side of the junction is formed by a main doped part 1126 called upper, for example of N type, extending horizontally from one side of the guide region 1120. In the part of it distanced from the guide region 1120, this main doped part 1126 has a difference in level h1126 forming an extra thickness rising to the surface of the component, and on which an electrode 1136 is arranged.

For each of the main doped areas 1122 and 1126, the extra thickness created by the difference in level h1122 in the outer part 11261 and 11221a creates an increase in the width t1126 and t1122a of material through which the currents i1126 and i1122a travelling between the active area 1129 and the corresponding access electrode 1136 and 1131a pass.

The width t1126 (and/or t1122a) of this passed-through thickness can also be increased by enlarging the horizontal dimension d1126 (and/or d1122a) of the outer part 11261 of each of these main doped areas 1126 (and/or 1122).

Optionally, this upper main doped part 1126 has two different doping levels: the central part 1126a has a first doping level, and the part on the side of the electrode 1136 has a second, stronger, doping level, in the part in contact with the electrode.

As stated above, the position of the limits of the doping areas or doping levels can vary in relation to the position of the extra thicknesses and/or of the electrodes.

Influence of the Capacitive Environment

FIG. 12 to FIG. 15 illustrate embodiment examples of the invention comprising, in addition to a configuration with extra thicknesses h522 and h526 in a similar manner to the example of FIG. 5, features for modifying the layers plumb with the diode 530 in order to reduce the influence of the capacitive environment on the modulator.

Figure 12:
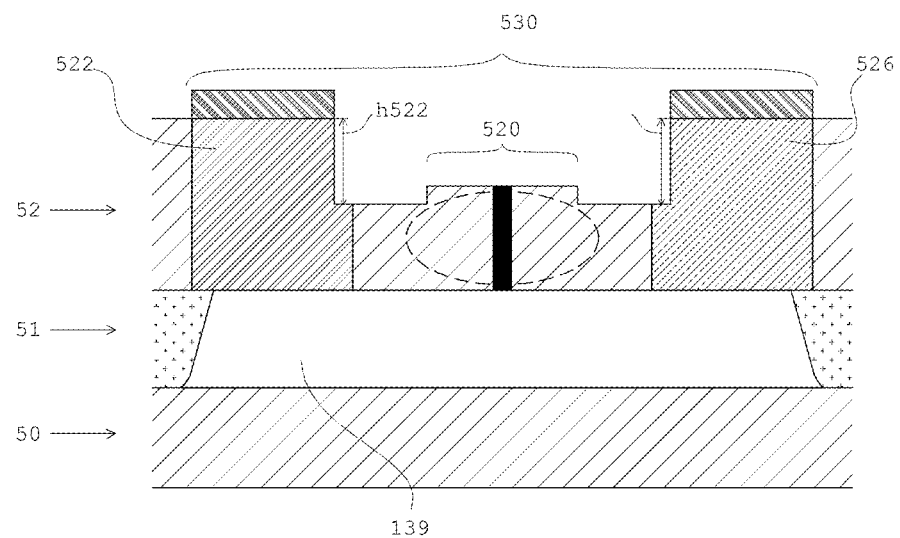
FIG. 12 is a transverse cross-section illustrating an embodiment example of the invention with removal of the insulator plumb with the diode in a PIN type lateral configuration with vertical doped plane.
Figure 13:
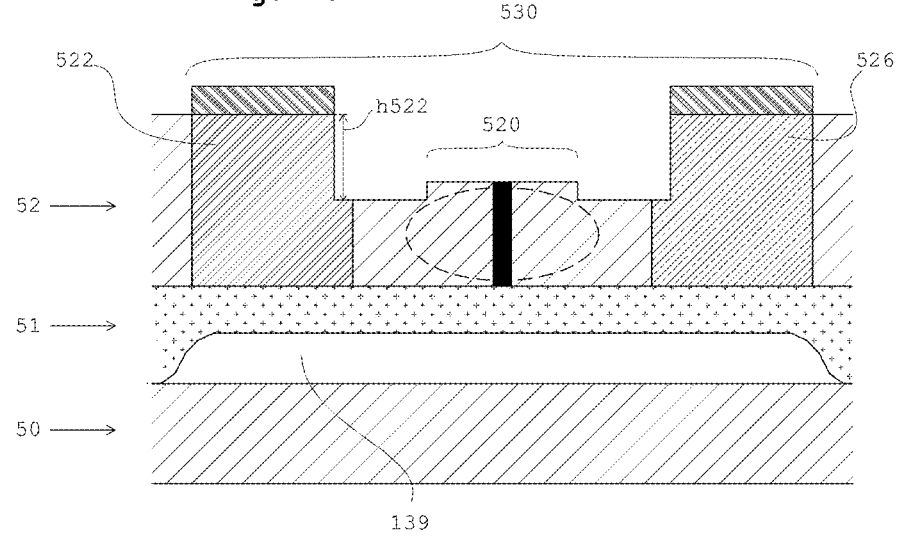
FIG. 13 is a transverse cross-section illustrating an embodiment example of the invention with thinning of the underlying insulator plumb with the diode in a PIN type lateral configuration with vertical doped plane.

By increasing the insulation: FIG. 12 and FIG. 13 show two examples in which the insulator layer 51 has been removed and thinned respectively, in the area 139 located plumb with the diode 530, preferably by including in it the main doped areas 522 and 526.

Figure 14:
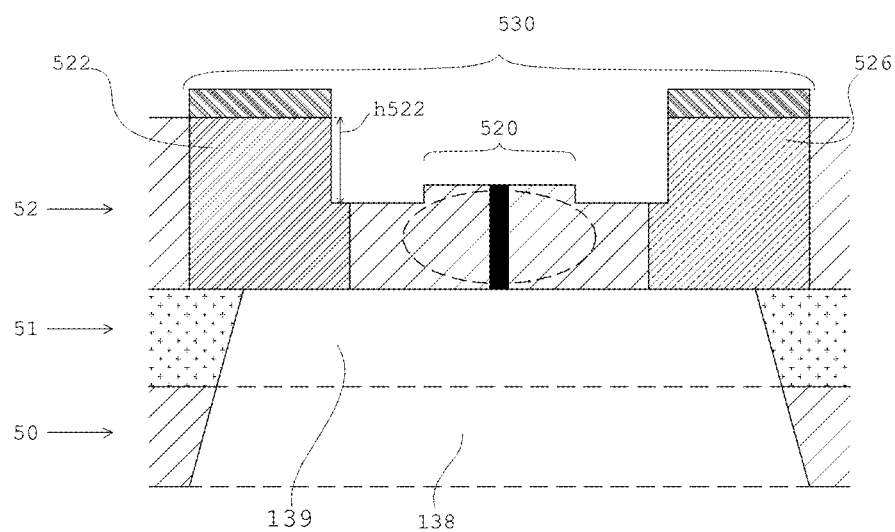
FIG. 14 is a transverse cross-section illustrating an embodiment example of the invention with removal of the underlying insulator and substrate plumb with the diode in a PIN type lateral configuration with vertical doped plane.

By increasing the resistance of the substrate: FIG. 14 shows an embodiment example of the invention in which, in addition to a configuration with extra thicknesses and a removal of the insulator in a similar manner to the example of FIG. 12, the semiconductor 50 of the original substrate in the area 138 located plumb with the diode 530 is removed, preferably by including in it the main doped areas 522 and 526.

Figure 15:
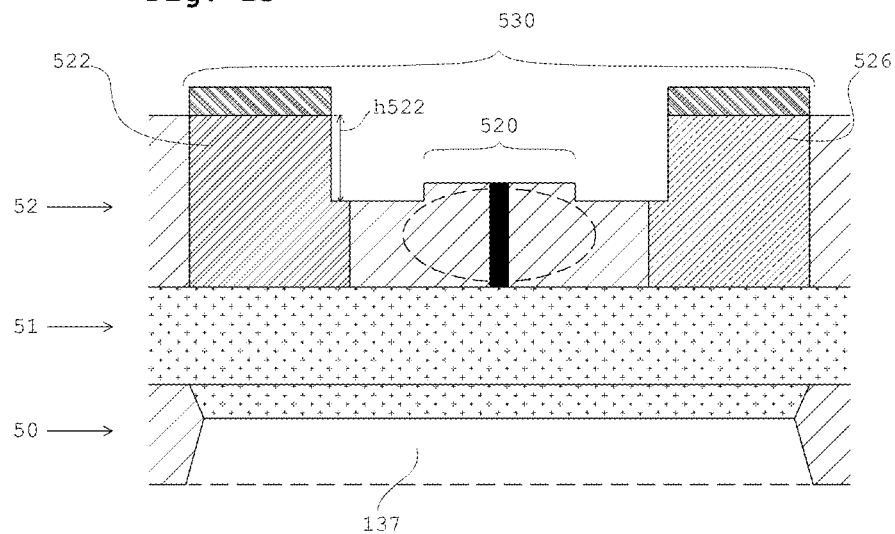
FIG. 15 is a transverse cross-section illustrating an embodiment example of the invention with thickening of the insulator and removal of the substrate plumb with the diode in a PIN type lateral configuration with vertical doped plane.

By a combination of some of these features: FIG. 15 shows an embodiment example of the invention in which the silicon 50 of the substrate has been removed and the thickness of the insulator 51 in the area 137 located plumb with the diode 530 has been increased, preferably by including in it the main doped areas 522 and 526.

This feature can be obtained for example by first thinning the silicon 50 in this region 137, then by oxidizing the silicon which remains there in order to convert it into insulating silica.

Alternatively, and according to its initial thickness, it is also possible to oxidize the silicon 50 of the substrate directly in this region 137, so as to convert it into insulator over the whole of its thickness up to the insulator layer 51.

Integration in a Circuit

Figure 16:
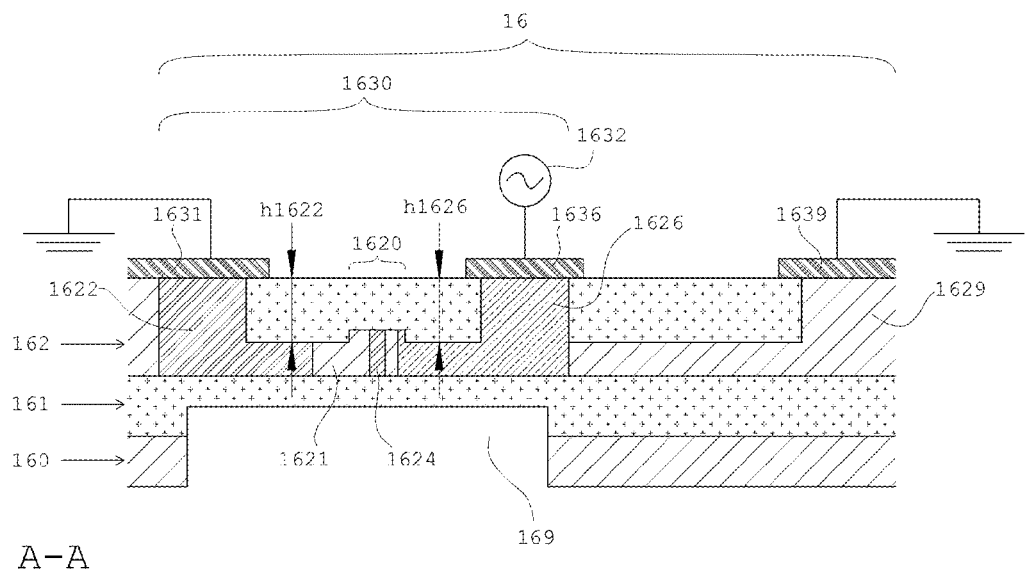
FIG. 16 illustrates an embodiment example of an intensity modulator according to the invention, comprising a Mach-Zehnder interferometer similar to that of FIG. 3 in a cross-section along AA, including a phase modulator according to the invention, with:
 extra thickness towards the top of the main doped parts,
 removal of the substrate and thinning of the insulator plumb with and below the diode,
 in an asymmetrical PIN type configuration with vertical doped plane.

FIG. 16 illustrates an example of an intensity modulator according to the invention. The intensity modulation is obtained in this example by assembly in a Mach-Zehnder interferometer (similar to that of FIG. 3) of a phase modulator according to the invention. In this embodiment of the invention, the phase modulator comprises a PIN type linear diode 1630 in lateral configuration asymmetrical to a doped plane 1624. This diode comprises two main doped parts 1622 and 1626, each with a difference in level h1622 and h1626 respectively, forming two extra thicknesses on which two electrodes 1631 and 1636 are arranged.

The underlying layer 160 of semiconductor substrate is removed and the underlying layer of insulator 161 is thinned, in a region 169 extending plumb with the diode 1630.

One 1636 of the electrodes is connected to the electrical input signal 1632, and the other electrode 1631 is connected to earth. Approximately symmetrically around the signal electrode 1636, a second earth electrode 139 approximately symmetrical to the first one 1631 is arranged on another non-doped semiconductor part with a shape approximately symmetrical to the main doped part 1622 which is connected to the first earth electrode 1631.

Figure 17:
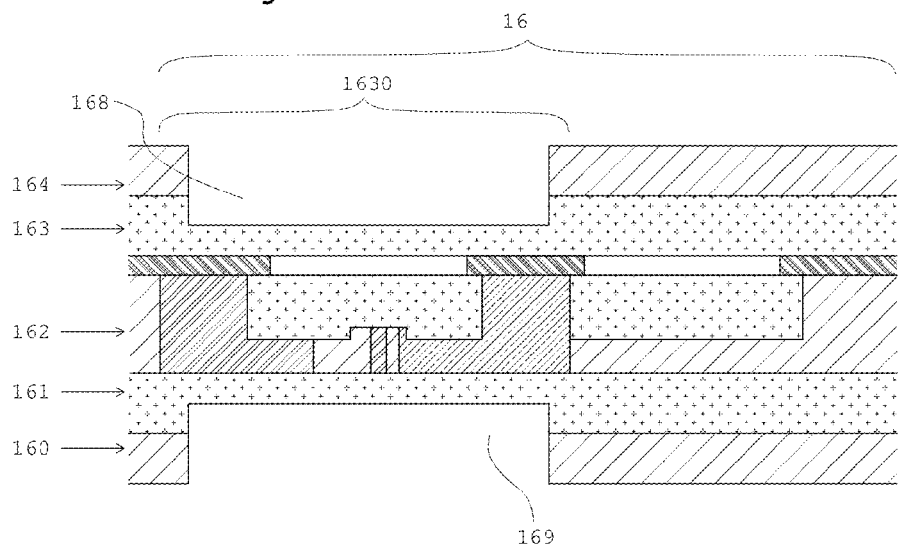
FIG. 17 represents the embodiment of the invention shown in cross-section in FIG. 16, after covering by an insulator layer and a semiconductor layer for a 3D integration, in which, plumb with and above the diode:
 the insulator layer is thinned, and
 the semiconductor layer is removed.

FIG. 17 represents an intensity modulator similar to that of FIG. 16 on which an insulator layer 163, itself covered by a semiconductor substrate layer 164, has been added, for example by bonding or by depositing.

In the same manner and for the same reasons as for the underlying layers of insulator 161 and of substrate 160, the upper substrate layer 164 has been removed and the upper insulator layer 163 has been thinned in a region 168 extending plumb with the diode 1630.

From this example representing the removal of the substrate and the thinning of the insulator, it is illustrated here that all of the features of the invention relating to the processing of the insulator and substrate layers can also apply to the layers located above the diode, and therefore thus to the layers surrounding this diode on both of its sides.

Figure 18A:
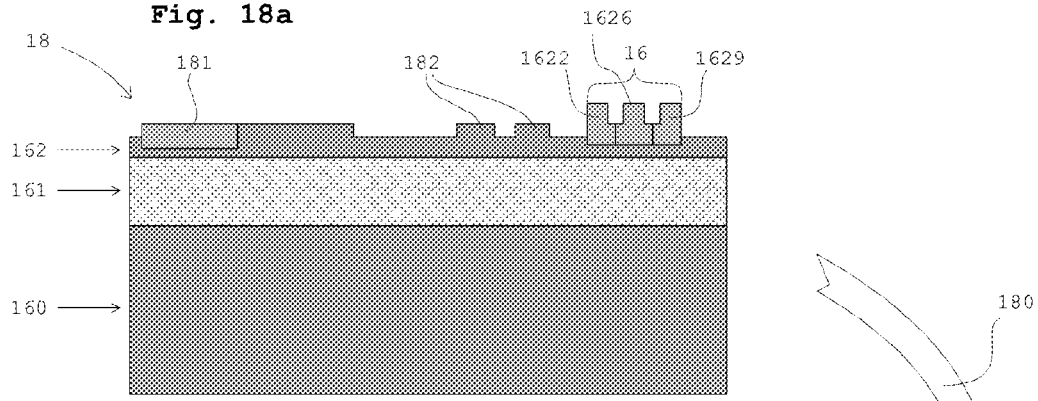
FIGS. 18a and b illustrate two phases of a 3D integration process by assembly of an optronic circuit comprising a modulator according to the invention on a CMOS type electronic circuit.
Figure 18B:
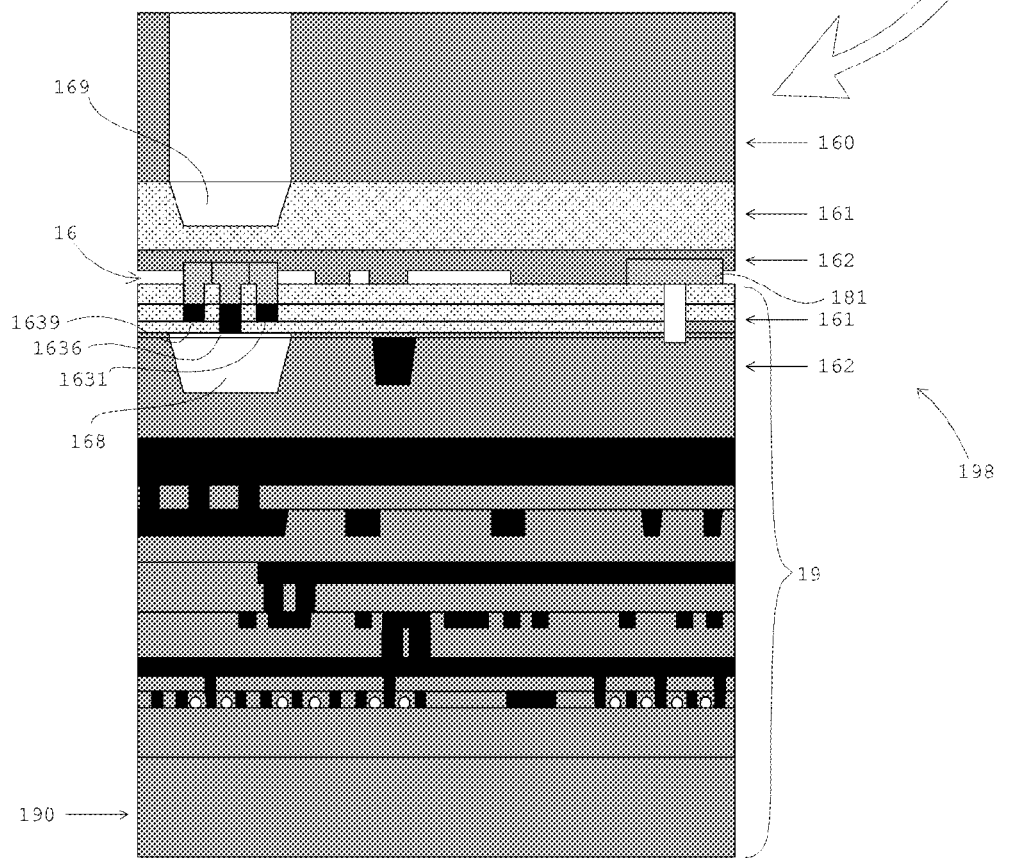

FIG. 18a and FIG. 18b illustrate, according to the invention, two phases of an integration process called "3D integration", constituting an example of an integration process including a modulator according to the invention similar to that of FIG. 16 including its access resistance features as well as its features for processing the neighbouring layers 160 and 161.

An intensity modulator 16 according to the invention is produced on the surface of an optical or optronic circuit 18, based on an insulator layer 161 carried by a semiconductor substrate 160. This circuit 18 comprises for example a photodetector 181 and waveguides 182.

During an assembly stage 180, for example by bonding, this circuit 18 is bonded in the inverted position on another circuit, for example a CMOS type electronic circuit 19 based on a substrate 190. This assembly is carried out by applying the upper surface (of the side opposite its initial substrate 160) of the circuit 18 on the upper surface (of the side opposite its substrate 190) of the circuit 19.

Thus a hybrid circuit including an optronic part, with great compaction and not requiring all of the circuit 19 to be subjected to processes and operations specific to the optical elements of the optical circuit 18, is obtained.

Within the scope of such a 3D integration process, the processing of the neighbouring layers of the diode 1630 of the modulator 16 according to the invention can be carried out in particular:

before assembly, on the CMOS circuit 19, for layers of insulator 163 and of semiconductor 164; and before or after assembly, on the optical circuit 18, for the layers of insulator 161 and of semiconductor 160.

In particular, the 3D integration on another circuit 19 gives the initial circuit 18 a sufficient rigidity to be able to remove the whole of the substrate 160 on which it was initially produced.

It is thus seen that the invention allows gains with regard to performance which are applicable to existing circuits and manufacturing processes, with no or few modifications to be made to these circuits or processes.

Of course, the invention is not limited to the examples which have just been described, and numerous adjustments can be made to these examples without exceeding the scope of the invention.

The invention claimed is:

1. An optoelectronic component for controlling an optical signal travelling in a micro-waveguide, the component including a substrate comprising:

a first semiconductor layer including a surface and a rib projecting outwardly from said surface;

at least one second semiconductor layer; and at least one insulator layer between said first semiconductor layer and said at least one second semiconductor layer, wherein said micro-waveguide comprises an active area centered on or surrounding an optical mode created by said rib and located between a P type doped area and an N type doped area, called main doped areas, forming a diode between them, said P or N main doped areas being connected to two electrodes arranged on either side of said active area, laterally or vertically, and making it possible to polarize said diode, at least one of said first semiconductor layer, said at least one second semiconductor layer and said at least one insulator layer including a modified structure configured for reducing the influence of the capacitive effect formed between the main doped areas and said at least one second semiconductor layer.

2. The component according to claim 1, wherein said semiconductor layer presents a resistivity of at least 100 ohms·m.

3. The component according to claim 1, wherein said at least one second semiconductor layer includes at least one of a thinned portion and an absent portion in at least one part of said at least one second semiconductor layer located plumb with the doped or intrinsic areas forming the diode.

4. The component according to claim 1, wherein said at least one insulator layer has a thickness of at least 2 micrometers.

5. The component according to claim 1, wherein said at least one insulator layer includes at least one of a thinned portion and an absent portion in at least one part of the at least one insulator layer located plumb with the doped or intrinsic areas forming the diode.

6. The component according to claim 1, wherein at least one of said main doped areas has a greater transverse dimension relative to the current direction obtained by having an extra thickness, or a greater horizontal dimension in a part of the doped areas connected to the respective electrodes relative to the part of the doped areas closest to said active area.

7. The component according to claim 6, wherein the two main doped areas have an extra thickness in the part of doped areas connected to their respective electrodes relative to the part of the doped areas closest to the active area, said extra thickness being covered by a metallic layer forming the lower part of said electrode.

8. The component according to claim 1, wherein the main doped areas are separated by an area of a semiconductor not intentionally doped in the majority of it, called intrinsic area, and together form a PIN type diode.

9. The component according to claim 8, wherein the intrinsic area further comprises at least one P or N type doped area forming a flat layer that is horizontal or vertical, or parallel to a plane separating the main doped areas from each other, called doping plane.

10. The component according to claim 9, wherein the first semiconductor layer forms a diode in which the main doped areas are located on either side of the center of the active area normal to a plane of the substrate layer, called lateral diode, and comprises an intrinsic area with at least one vertical doped plane.

11. The component according to claim 9, wherein the first semiconductor layer forms a diode in which the main doped areas are located on either side of the center of the active area relative to a horizontal plane, called vertical diode, this diode comprising an intrinsic area with at least one horizontal doped plane.

12. The component according to claim 9, wherein the diode is of PIN type diode with a single doped plane.

13. The component according to claim 1, wherein the main doped areas are in contact with each other in a junction area and together form a PN type diode.

14. A manufacturing process comprising selected, defined and combined steps in order to produce a component according to claim 1.

15. The process according to claim 14, comprising at least one integration of the component in a complex or compact or hybrid circuit by a process of the "three-dimensional integration" type including one of a covering of said component by one or more layers forming at least one component with a different function, or an assembly with one or more layers forming at least one component with a different function, or a combination of the two.

16. A device for controlling an optical signal from an electrical signal, comprising at least one control component according to claim 1.

17. The device according to claim 16, wherein the control component is used to produce a phase modulation in an optical signal injected at one end of the micro-waveguide of said control component, by applying the electrical signal to the electrodes of the diode of said control component.

18. The device according to claim 17, wherein the control component comprises a PN diode, or a PIN diode without doped plane in its intrinsic region, or a PIN diode with at least one doped plane in its intrinsic region, said diode being used in depletion type mode.

19. The device according to claim 17, wherein the control component comprises a PN diode, or a PIN diode without doped plane in its intrinsic region, said diode being used in carrier injection type mode.

20. The device according to claim 16, wherein the device uses at least one control component to produce an intensity modulation in an optical signal.

21. The device according to claim 16, wherein the device uses at least one control component to produce a phase modulation in an optical signal, within a Mach-Zehnder type interferometric device, or Fabry-Perot resonator or ring resonator, set up to convert said phase modulation into an intensity modulation of said optical signal.

22. The process of claim 14, further comprising a step of thinning or removing the at least one second semiconductor layer located in at least one part of an area of the at least one second semiconductor layer located plumb with the doped or intrinsic areas forming the diode.

23. The process of claim 14, furthermore comprising a step of thinning or removing at least a part of the insulator layer, located plumb with the doped or intrinsic areas forming the diode.

24. An optoelectronic component for controlling an optical signal travelling in a micro-waveguide, the component including a substrate comprising:
- a semiconductor layer including a surface and a rib projecting outwardly from said surface; and
- at least one insulator layer;
    - said micro-waveguide comprises an active area centered on or surrounding an optical mode created by said rib and located between a P type doped area and an N type doped area, called main doped areas, forming a diode between them,
- said P or N main doped areas being connected to two electrodes arranged on either side of said active area, laterally or vertically, and making it possible to polarize said diode,
- said at least one insulator layer including a modified structure configured for reducing the influence of the capacitive effect formed between the main doped areas, wherein said modified structure includes a thickness of said at least one insulator layer being greater in an area located plumb with the diode.

* * * * *

UNITED STATES PATENT AND TRADEMARK OFFICE
CERTIFICATE OF CORRECTION

PATENT NO. : 8,693,811 B2
APPLICATION NO. : 13/258304
DATED : April 8, 2014
INVENTOR(S) : Delphine Morini et al.

Page 1 of 1

It is certified that error appears in the above-identified patent and that said Letters Patent is hereby corrected as shown below:

Title page item (73) Assignee, please insert --"Université Paris Sud, Orsay, (FR)--

Signed and Sealed this
Fifth Day of July, 2016

Michelle K. Lee
*Director of the United States Patent and Trademark Office*